United States Patent [19]

Dyson

[11] 4,434,015
[45] Feb. 28, 1984

[54] DEVICE AND METHOD FOR CUTTING CIRCULAR PIECE PARTS

[76] Inventor: Herbert C. Dyson, 2519 Darlean St., Sulphur, La. 70665

[21] Appl. No.: 425,662

[22] Filed: Sep. 28, 1982

[51] Int. Cl.³ .............................................. B23K 7/10
[52] U.S. Cl. ..................................... 148/9 R; 266/70
[58] Field of Search .......................... 266/70; 148/9 R

[56] References Cited

U.S. PATENT DOCUMENTS

| | | | |
|---|---|---|---|
| 1,176,584 | 3/1916 | Madgett | 266/70 |
| 2,017,430 | 10/1935 | Anderson | 266/70 |
| 2,801,098 | 7/1957 | Plumb | 266/70 |
| 3,028,154 | 4/1962 | Johnson | 266/70 |

Primary Examiner—W. Stallard
Attorney, Agent, or Firm—John Wade Carpenter

[57] ABSTRACT

A device for cutting circular piece parts of various diameters comprising a shaft having a central axis and a cutting element mounted on a rack at a random radius from the axis. The rack supports the cutting element for changing the position of the cutting element relative to the axis to effectively change the radius and thus the diameter of the circular piece part. The method includes mounting the shaft at a point corresponding to the center of the piece part and fixing a cutting element to the rack. The cutting element is positioned relative to the work piece to perform a cutting operation. When the rack is rotated about the shaft and the point, the attached cutting element also rotates about the point during the cutting operation to develop the circular piece part.

8 Claims, 6 Drawing Figures

DEVICE AND METHOD FOR CUTTING CIRCULAR PIECE PARTS

BACKGROUND OF THE INVENTION

1. Field of the Invention

This invention is related to a device for cutting circular piece parts. More specifically, this invention relates to a method and a portable device for cutting circular piece parts of various diameters.

2. Description of the Prior Art

U.S. Pat. No. 4,256,288 by Rojas discloses a portable hole cutting apparatus wherein the torch is supported by means of a frame which includes a vertically extending pivot point engageable with the plate through which a hole is to be cut. The torch is mounted for rotational movement with respect to the pivot point bar and is rotated by means of a motor driven gear drive. A somewhat similar arrangement is disclosed in U.S. Pat. No. 2,801,093 by Plumb wherein the torch is supported on a stand and is rotatable relative thereto by means of a mechanical gear drive to cause the torch to scribe a circle of a desired dimension which may be quite small. U.S. Pat. No. 2,463,075 by Young also discloses a holder for a torch used to cut openings and metal. The device uses a pivot point, a motor, and a gear drive which causes the torch to scribe a circle about the pivot point. The torch may be adjusted to whatever diameter opening is to be cut. U.S. Pat. No. 2,223,720 by Doyle is also relevant in this regard and shows a slightly different arrangement using a torch that is mechanically rotatable but which may scribe a rather small opening. Further prior art are the disclosures in U.S. Pat. No. 3,028,154 by Johnson and U.S. Pat. No. 4,021,025 by Frame. None of the foregoing prior art teach or suggest the improved portable circle cutter and method of this invention.

SUMMARY OF THE INVENTION

This invention accomplishes its desired objects by providing a device and method of cutting circular piece parts of various diameters from a work piece. The device comprises a base and a shaft having a central axis and bound to the base. A rotating cutting means is adjustably mounted on the shaft at a random radius from the central axis thereof. A rotating means is mounted on the shaft for rotating the cutting means and for controlling the rotating speed and direction of the same. The rotating cutting means comprises a rack means, and settable means engaging the rack means for changing the position of the cutting element relative to the central axis. The rotating means mounted on the shaft for rotating the cutting and for controlling the rotating speed and direction of the same comprises a gear box means rotatably mounted around the shaft; a central box means; and a motor means electrically connected to the control box means and mechanically engaging the gear box means. The method of cutting circular piece parts from a work piece comprises mounting a shaft at a point corresponding to the center of a piece part; and fixing a cutting means and a means for rotating the cutting means to the shaft. The cutting means is positioned from the shaft relative to the work piece to perform a cutting operation. The method further comprises rotating the cutting means and the means for rotating the cutting means about the point during a cutting operation to develop the circular piece part.

It is an object of the invention to provide a device and method of cutting circular piece parts of various diameters from a work piece.

It is another object of the invention to provide a device for cutting circular piece parts which is relatively inexpensive to manufacture, and can be easily transported and connected to the work piece from which a circular piece part is cut.

These, together with the various ancillary objects and features, will become apparent as the following description proceeds, are attained by this invention preferred embodiments being shown in the accompanying drawings, by way of example only wherein:

DETAILED DESCRIPTION OF THE INVENTION

Figure 1:
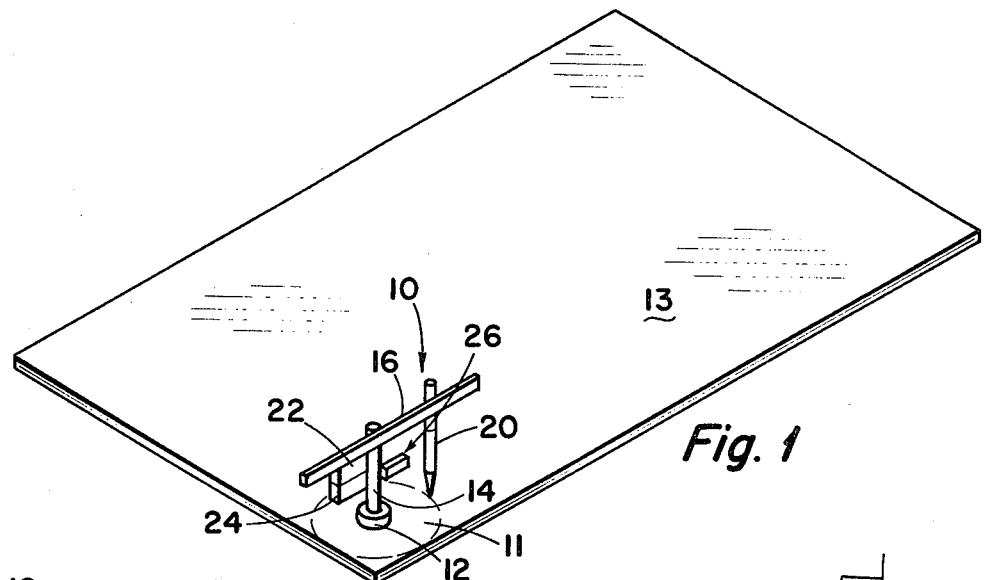
FIG. 1 is a perspective schematic view of the circle cutter positioned in the corner of a work piece.
Figure 2:
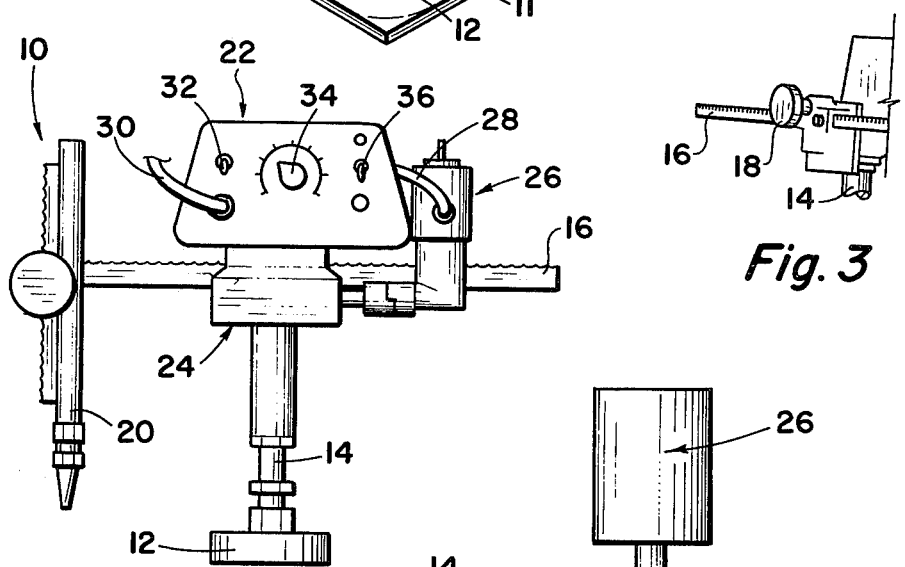
FIG. 2 is a side elevational view of the invention.

Referring in detail now to the drawings, wherein similar parts of the invention are identified by like reference numerals, there is seen the improved portable circle cutter, generally illustrated as 10, for cutting a circular piece part 11 from a work piece 13. Circle cutter 10 has a base 12, and a shaft 14 including a central axis and mounted to the base 12. Rotatably positioned around the top of the shaft 14 is a gear box means, generally illustrated as 24. A control box means, generally illustrated as 22, is mounted on top of the gear box means 24; and a motor means, generally illustrated as 26, having a motor shaft 27, mechanically engages the gear box means 24 and electrically connects to the control box means 22 by a conductor 28.

Gear box means 24 comprises a gear housing 38 including a housing cover 39 with an oil fill plug 40, an oil level plug 42, and oil drain plug 44, and a housing gasket means 45. Input shaft 46 includes integrally bound thereto a worm gear 48 and is rotatably positioned around bearings 50-50 within gear housing 38. Bearing retainers 52-52 retain bearings 50-50 within gear housing 38. An input shaft beveled gear 54 is bound to an end of the input shaft 46 and mates with a motor beveled gear 56 that is bound at the end of the motor shaft 27. Input shaft 46 receives its rotational power from the mating beveled gears 54 and 56 which transfers the rotational power of the motor shaft 27 of the motor means 26 into the rotational power for the input shaft 46.

Figure 3:
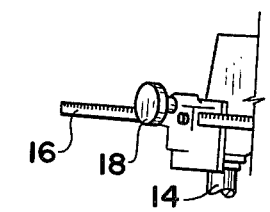
FIG. 3 is a partial perspective view of the saw tooth rack which holds the cutter, and mounted to the gear housing and the pinion gear knob used to set the distance of the cutter from the central axis of the shaft.
Figure 4:
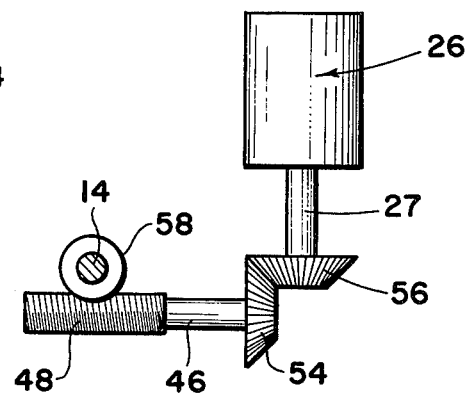
FIG. 4 is a side elevational view of the assembly of the motor, bevel gears, worm gear, and spindle worm gear.
Figure 5:
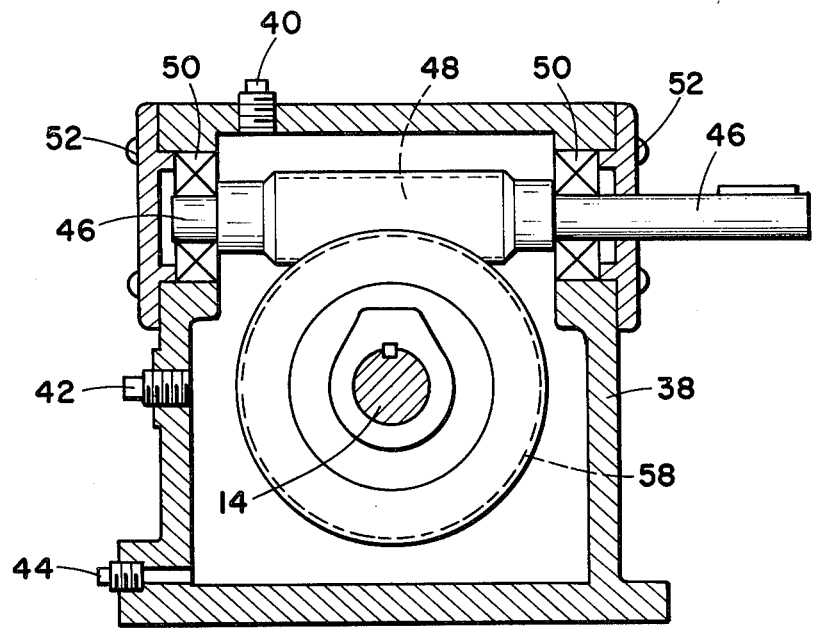
FIG. 5 is a front vertical sectional view of the gear box assembly.
Figure 6:
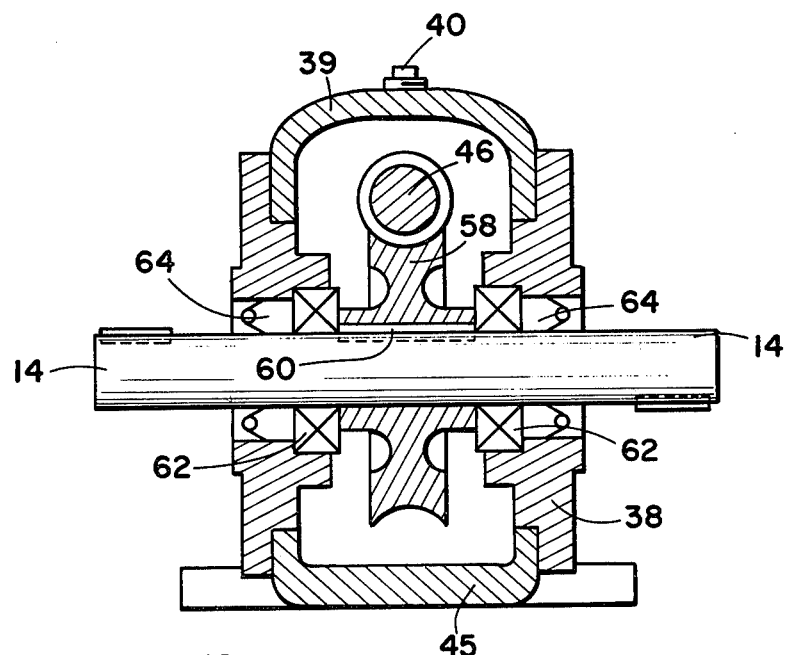
FIG. 6 is a side vertical sectional view of the gear box assembly.

A shaft worm gear 58 is keyed at 60 to the shaft 14 and mates with the worm gear 48. The shaft 14 and the shaft worm gear 58 remain stationary during operation of the device 10, and the rotation of the rotating work gear 48, integral with the input shaft 46 and mating with the shaft worm gear 58, causes the worm gear 48 to circumferentially traverse the stationary shaft worm gear 58 which in turn causes the gear housing 38, the central box means 22, and the motor means 26 to rotate around the stationary shaft 14. A saw tooth rack 16 is preferably connected to the gear housing 38 (see FIG. 3) and is engaged by a pinion gear 18. A cutting element (e.g. an acetylene torch) 20 is secured to an end of the saw tooth rack 16.

When the pinion gear 18 is rotated in a predetermined direction (i.e. clockwise or counter-clockwise), the rack 16 moves and changes the distance of the cutting element 20 from the central axis of the shaft 14 to get the desired radius of the circular piece part 11. Because in a preferred embodiment of the invention the rack 16 is attached to the gear housing 38, as the gear housing 38, along with the central box means 22 and the motor means 26, rotates around the stationary shaft 14 and the stationary keyed shaft worm gear 58, the rack 16 and attached cutting element 20 also rotates around the same.

The turn ratio of the worm gear 48 to the shaft worm gear 58 may be any standard ratio; however, I have discovered that in a preferred embodiment of the invention the turn ratio is 50:1 in order to achieve the flexibility of cutting a circular piece 11 from 5 inches in diameter up to 8 feet in diameter from the work piece 13.

Control box means 22 has an inlet power conductor 30 for power from a power outlet; on-off means 32 for rendering power to the motor means 26; and speed control means 34 for controlling the power to the motor means 26 which further in turn controls the rotational speed of the gear housing 38 and the attached rack 16—cutting element 20 combination, the control box means 22, and the motor means 26, about the stationary shaft 14 and the keyed thereto shaft worm gear 48. The control box means 22 additionally includes a switch means 36 for changing the rotational direction of the motor shaft 27 of the motor means 26. By changing the rotational direction of the motor shaft 27, the direction of circular rotation of the rack 16—cutting element 20—gear housing 38 combination about the stationary shaft 14 is likewise changed via the reverse rotation of the input shaft 46 and integral worm gear 48.

The internals, such as the wiring and electrical components, of the control box means 22 are not uncommon to those in the art.

Motor means 26 may be any type of motor which is capable of providing power via the mating beveled gears 54 and 56 to the gear box means 24 for rotating the gear box means 24 (except the stationary shaft worm gear 58 which is keyed at 60 to stationary shaft 14), the attached to gear housing 38 rack 16—cutting element 20 combination, the control box means 24, and the motor means 26 itself about the stationary shaft 14.

With continuing reference to the drawings for operation of the invention and the method of cutting a circular piece part 11 from a work piece 13, the portable circle cutter 10 is mounted on the work piece 13 such that stationary shaft 14 is at the center of the piece part 11 to be cut. Inlet power conductor 30 is plugged into a power outlet. Pinion gear 18 is rotated until the desired distance of the cutting element 20 on rack 16 from the central axis of the stationary shaft 14 is achieved. In a preferred embodiment of the invention, this distance is from 2½ inches up to 4 feet. The ability of my improved circle cutter 10 to cut such distances from the center of the piece part 11 is accomplished by a worm gear 48 to shaft worm gear 58 turn ratio of 50:1. After the cutting element 20 is set on the rack 16 with respect to the central axis of the shaft 14, the direction and speed of rotation (e.g. clockwise of counter-clockwise) of the rack 16 cutting element 20 combination about the stationary shaft 14 is respectively set by switch 36 and control knob 34. Control knob 34 is set at a low rack 16 rotating speed if the work piece 13 is relatively thick and at a higher speed if the work piece 13 is thinner. Subsequently, switch 32 is turned on and the cutting operation begins. Cutting element 20 may be any cutting mechanism, but in a preferred embodiment of the invention, cutting element 20 is an acetylene welding torch which burns a mixture of acetylene and oxygen.

Circle cutter 10 may be mounted to the work piece 13 in any position, such as from a horizontal position to a normal position and up to a vertical upside down position. Obviously, if the position of the cutter 10 on the work piece 13 is anything other than essentially horizontal, some means of affixing the base 12 of the cutter 10 to work piece 13 is needed, such as magnetizing the base 12 or utilizing nuts and bolts.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A device for cutting circular piece parts of various diameters comprising a base; a shaft having a central axis and bound to said base; a rotating cutting means adjustably mounted on said shaft at a random radius from the central axis thereof; and a rotating means mounted on said shaft for rotating said cutting means and for controlling the rotating speed and direction of the same, said rotating means mounted on said shaft for rotating said cutting means and for controlling the rotating speed and direction of the same comprises a gear box means rotatably mounted around said shaft; a control box means; and a motor means electrically connected to said control box means, said rotating cutting means comprises a rack means; a cutting element mounted on said rack means; and settable means attached to said gear box means and engaging said rack means for changing the position of the cutting element relative to said central axis.

2. The device of claim 1 wherein said gear box means comprises a gear housing; an input shaft rotatably positioned into said gear housing; a worm gear integral with a portion of said input shaft; a shaft worm gear mating with said worm gear and keyed to said shaft.

3. The device of claim 2 wherein said shaft and said keyed shaft worm gear thereto remain stationary during operation of the device and the rotation of said rotating worm gear integral with said input shaft and mating with said shaft worm gear causes the worm gear to circumferentially traverse the shaft worm gear which in turn causes the the gear housing, the control box means, the cutting means and the motor means to circumferentially traverse or rotate around the shaft.

4. The device of claim 3 wherein said rack means comprises a rack having a structure defining a saw tooth horizontal bar; and said settable means includes a pinion gear which engages said rack such that when said pinion gear is rotated in a predetermined direction, the rack moves and changes the distance of the cutting element from the central axis of the shaft to get the desired radius of the circular piece part.

5. The device of claim 4 wherein said rack is connected to said gear housing; said control box means is mounted on top of said gear box means and comprises a means for changing the directional rotation of said rack and attached cutting element about said shaft; and a means for changing the rotational speed of said rack and cutting element about the shaft.

6. The device of claim 5 additionally comprising a pair of mating beveled gears, said motor means drives said mating beveled gears and the output of said beveled gears makes a driving connection with said input shaft of said gear box means.

7. A method of cutting circular piece parts from a work piece comprising the steps of:
   (a) mounting a shaft at a point corresponding to the center of a piece part;
   (b) fixing a cutting means and a means for rotating said cutting means to said shaft;
   (c) positioning the cutting means from said shaft relative to the work piece to perform a cutting means from said shaft relative to the work piece to perform a cutting operation;
   (d) rotating said cutting means and said means for rotating said cutting means about said point during a cutting operation to develop said circular piece part; and said
   (e) fixing step (b) comprises fixing the cutting means from said shaft to cut a circular piece having a diameter of from approximately 5 inches up to approximately 8 feet.

8. The method of claim 7 wherein said rotating step (d) is about said shaft which remains stationary; said method additionally comprising controlling the speed and direction of said rotating step (d).

* * * * *